US005562842A

United States Patent [19]

Laferriere

[11] Patent Number: 5,562,842
[45] Date of Patent: Oct. 8, 1996

[54] MATERIAL TREATMENT APPARATUS COMBINING A LASER DIODE AND AN ILLUMINATION LIGHT WITH A VIDEO IMAGING SYSTEM

[75] Inventor: Paul Laferriere, Somerville, Mass.

[73] Assignee: Panasonic Technologies, Inc., Princeton, N.J.

[21] Appl. No.: 324,343

[22] Filed: Oct. 17, 1994

[51] Int. Cl.⁶ ...................................................... B23K 26/02
[52] U.S. Cl. ................................ 219/121.83; 219/121.73
[58] Field of Search ......................... 219/121.73, 121.74, 219/121.83, 121.68; 362/32, 89; 382/152; 348/131, 359, 370

[56] References Cited

U.S. PATENT DOCUMENTS

| | | | |
|---|---|---|---|
| 3,278,739 | 10/1966 | Royka et al. | 362/32 |
| 3,803,413 | 4/1974 | Vanzetti et al. | 250/338 |
| 4,481,418 | 11/1984 | Vanzetti et al. | |
| 4,531,044 | 7/1985 | Chang | 219/121.85 |
| 4,657,169 | 4/1987 | Dostoomian et al. | 228/103 |
| 4,789,770 | 12/1988 | Kasner et al. | 219/121.74 |
| 4,893,742 | 1/1990 | Bullock | 219/121.63 |
| 4,914,272 | 4/1990 | Ito et al. | 219/121.63 |
| 4,963,714 | 10/1990 | Adamski et al. | 219/121.63 |
| 4,974,094 | 11/1990 | Morito | 362/32 |
| 5,023,426 | 6/1991 | Prokosch et al. | 219/121.63 |
| 5,038,950 | 8/1991 | Yahagi | 219/121.83 |
| 5,055,652 | 10/1991 | Jones et al. | 219/121.64 |
| 5,118,193 | 6/1992 | Brown et al. | 256/237 |
| 5,122,635 | 6/1992 | Knodler et al. | 219/121.63 |
| 5,164,565 | 11/1992 | Addiego et al. | 219/121.83 |
| 5,173,584 | 12/1992 | Kahlert et al. | 219/121.83 |
| 5,208,437 | 5/1993 | Miyauchi et al. | 219/121.83 |
| 5,233,152 | 8/1993 | Prokosch et al. | 219/121.63 |
| 5,302,836 | 4/1994 | Siu | 356/237 |
| 5,394,246 | 2/1995 | Sugawara | 348/131 |

FOREIGN PATENT DOCUMENTS 2-263587  10/1990  Japan ................... 219/121.83

Primary Examiner—Geoffrey S. Evans
Attorney, Agent, or Firm—Ratner & Prestia

[57] ABSTRACT

Apparatus for laser treatment of a material includes a source that generates a laser beam which a lens focuses into a focused beam having a predetermined cross-sectional diameter defining a spot. A dichroic mirror directs the focused beam along an optical axis such that the spot is produced on the material for treatment. A video camera monitors the treatment of the material and has an optical path extending at least partially along the optical axis of the focused beam. A ring illuminator is disposed around the optical axis to directly illuminate the material.

8 Claims, 2 Drawing Sheets

MATERIAL TREATMENT APPARATUS COMBINING A LASER DIODE AND AN ILLUMINATION LIGHT WITH A VIDEO IMAGING SYSTEM

FIELD OF THE INVENTION

This invention relates to a laser material treatment apparatus having a laser diode and a video imaging system. More particularly, this invention relates to the combination of an illumination light with such apparatus.

BACKGROUND OF THE INVENTION

Precision treatment of solid and liquid materials may be accomplished by heating the materials to a desired temperature at a location where treatment is desired. Examples of such heat treatment include soldering metallic parts, curing epoxy resins, removing plastic coatings from metals, and boring holes in solid materials.

Several techniques are currently used to perform precision heat treatment. One such technique is optical, using focused light, or lasers. The focused laser beam produces a high intensity spot on the material at the location where treatment is desired. Imaging systems are often used with laser material processing techniques to monitor the treatment process.

A laser treatment apparatus that uses video imaging to monitor the process commonly has the imaging device and the laser beam share the same optical axis. This ensures accurate monitoring of the treatment process by obtaining an image at the precise location where treatment occurs. In such a system, additional illumination is generally required for the imaging. Because the optical path of the imaging device is coextensive with the optical axis of the laser beam, conventional systems focus the illumination light onto material at the treatment location along this same axis.

FIG. 3 schematically illustrates a typical optical layout of such a prior art laser material processing system. The illustrated apparatus includes a laser 10, a video camera 11, and an illumination light 12. Laser 10 of FIG. 3 is a traditional gas or solid state laser which produces a laser beam 13 having a small divergence (typically less than 1 degree). Beam 13 from laser 10 is collimated by beam collimator 14. A beam expander (not shown) is sometimes disposed between laser 10 and beam collimator 14.

Dichroic mirror 15 deflects collimated beam 16 along optical axis 25 toward lens 20. Lens 20 is typically a microscope objective lens, sometimes of the "long-working distance" type (working distance being the distance from the target to the closest optical element). Lens 20 focuses beam 16 onto target 21. Target 21 is the material upon which treatment is desired.

Video camera 11 is used in such a conventional system to monitor the material treatment process. Video camera 11 receives the image of the treatment process from an optical path that extends perpendicularly from the treatment location on target 21, through dichroic mirror 15, through beam splitter 22, to video camera 11. The optical path of video camera 11 is thus the same as optical axis 25 of laser beam 16. A lens 23 may be disposed in the optical path in front of video camera 11.

Illumination light 12 is used to improve the quality of the image monitored by video camera 11. Light 24 from illumination light 12 is collected by simple lens 26 into light beam 27. Beam splitter 22 deflects light beam 27 onto lens 20 and target 21 at the material treatment location along the same optical axis 25 as that of laser beam 16 and video camera 11.

In the design of any material treatment process using video imaging, several desirable parameters, such as small laser beam spot size at the target and long working distance, must be balanced. With the type of system illustrated in FIG. 3, lens 20 is shared by the optical path 25 of laser 10, video camera 11, and illumination light 12. Lens 20 must therefore fulfill several constraints: it must focus the laser beam 16 to the smallest feasible spot size onto target 21, it must provide adequate working distance, and it must provide well-corrected, flat-field imaging over the desired field-of-view for video camera 11. (In systems such as that depicted in FIG. 3, the spot diameter is typically in the range of 0.001–0.1 mm, and the working distance is in the range of 1–15 mm.)

Because the traditional gas or solid state lasers used as laser 10 in the illustrated prior art system produce laser beams having a small divergence, it is possible for lens 20 to be designed and positioned such that an acceptable balance of the desired parameters in the system are produced.

When laser diodes are used instead of these traditional lasers, however, the higher divergence of the laser beam generated by the laser diode makes the design trade-offs in the material treatment system more difficult to resolve. Commercially available fiber-coupled laser diode arrays provide 15 W out of a fiber bundle of 1.5 mm diameter with a half-angle divergence of about 7 degrees. In applications such as soldering, it is desirable to use a beam spot of about 1 mm diameter, with a working distance of at least 20 mm. Commercial objective lenses for use as lens 20 are not suitable to provide these parameters, and it is not economical to "scale-up" an objective design. If lens 20 is replaced by a lens system which is less well-corrected than an objective, the lens will not give adequate flat-field imaging for the camera. The prior art system of FIG. 3 is thus unacceptable when laser 10 is a laser diode source.

In addition, the prior art material treatment system of FIG. 3 has the drawback that illumination light 27 reflects from perpendicular surfaces, such as lens 20 or flat metallic regions of target 21. This may result in undesirable bright spots in the image captured by video camera 11.

SUMMARY OF THE INVENTION

The present invention provides apparatus for laser treatment of a material that includes a laser diode source that generates a laser beam which a lens focuses into a focused beam having a predetermined cross-sectional diameter defining a spot. A dichroic mirror directs the focused beam along an optical axis such that the spot is produced on the material for treatment. A video camera monitors the treatment of the material and has an optical path extending at least partially along the optical axis of the focused beam. A ring illuminator is disposed around the optical axis to directly illuminate the material.

DETAILED DESCRIPTION OF THE INVENTION

Figure 1:
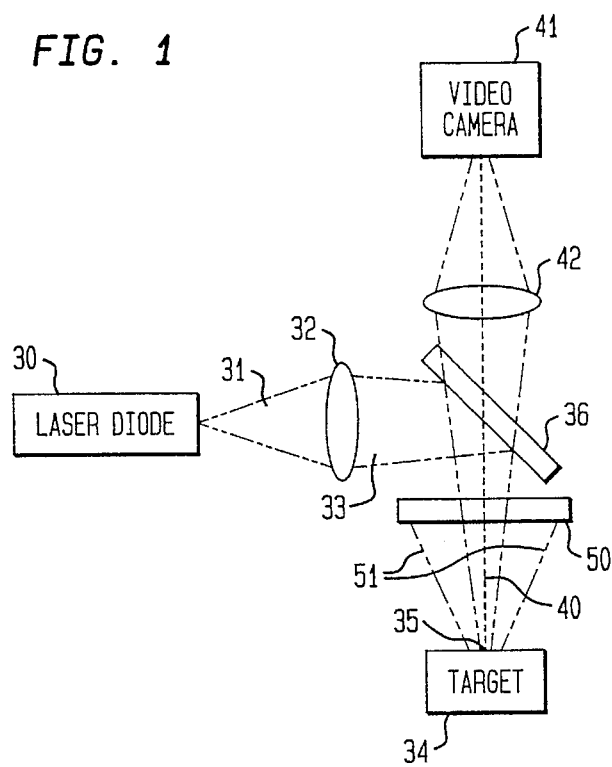
FIG. 1 is a schematic representation of an embodiment of a laser material treatment apparatus according to the present invention.

The present invention involves the application of illumination light directly to the material being treated using a ring illuminator in a laser diode material treatment apparatus with video imaging. FIG. 1 is a schematic illustration of one embodiment of the present invention.

In FIG. 1, laser diode 30 emits divergent laser beam 31. Laser beam 31 is actually a collection of individual beams emitted from an optic fiber bundle (not shown) made up of several individual optic fibers, each optically connected to a light emitting region on laser diode 30. Laser diode 30 may be a semiconductor laser diode bar, such as Opto Power Corp.'s Model #OPC-A020 -mmm-cs (approximately 1 cm wide, with an emitter to emitter distance of 400 microns and an emitter aperture size of 200×1 microns).

Laser beam 31 is focused by lens 32 into a focused beam 33. Lens 32 is designed and positioned relative to target 34 (which is the material to be treated) such that focused beam 33 has a cross-sectional diameter at target 34 suitable for treating the material. The cross-sectional diameter of focused beam 33 at target 34 defines a beam spot 35.

Dichroic mirror 36 deflects focused beam 33 in the illustrated embodiment along optical axis 40 onto target 34. This produces beam spot 35 on target 34 at the desired treatment location.

Video camera 41 monitors the material treatment process of laser diode beam spot 35 on target 34. The image received by video camera 41 has an optical path extending perpendicularly from target 34, through dichroic mirror 36, through lens 42, and to video camera 41. The optical path of video camera 41 is thus coextensive with optical axis 40 of focused beam 33. Any known video camera may be used to capture images of the material treatment process.

To illuminate target 34 and thereby enhance the video image of the material treatment, ring illuminator 50 is provided around optical axis 40 between lens 32 and target 34. Ring illuminator 50 provides illumination light that is not combined coaxially with focused laser diode beam 33, unlike prior art systems. Light beams 51 from ring illuminator 50 are directed onto target 34 at an acute angle. The optical axis of light beams 51 is thus different from the optical axis 40 of the focused laser diode beam 33 and video camera 41.

Figure 2A:
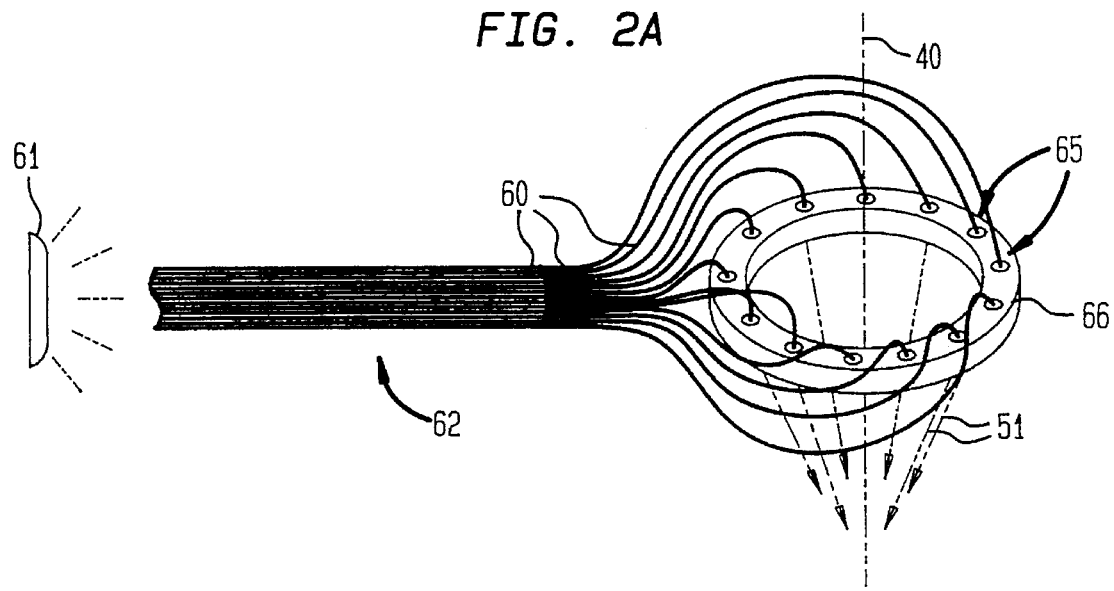
FIGS. 2(a) and 2(b) are plan views of exemplary ring illuminators in accordance with the present invention.

Ring illuminator 50 in the illustrated embodiment is a fiber optic bundle such as is commonly used in microscopy with inspection microscopes. Such a ring illuminator 50 is illustrated in FIG. 2(a). Optic fibers 60 are bundled in a cable 62 before being separated such that the ends 65 of each fiber 60 enters and is retained by circular terminating head 66. Light for fibers 60 is supplied by a bright lamp 61. An examplary fiber optic bundle illuminator is available from Edmund Scientific, Model J38,949.

Figure 2B:
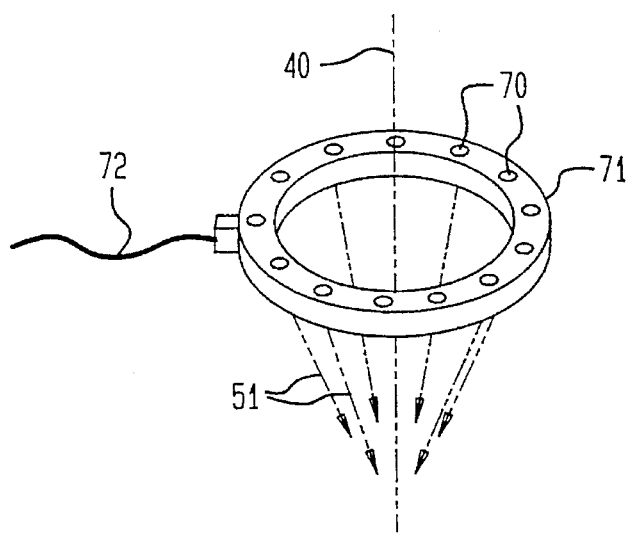

Alternatively, ring illuminator 50 may be an array of light emitting diodes in a circular arrangment as shown in FIG. 2(b). Light emitting diodes 70 are arranged in circular head 71 with a lens system (not shown). Electric cable 72 powers light emitting diodes 70.

As a result of the arrangement depicted in FIG. 1 where ring illuminator 50 shines directly on target 34, one beam splitter 22 of the prior art (FIG. 3) may be removed from the apparatus. The delivery of focused beam 33 to target 34 and the delivery of images from target 34 to video camera 41 in the present invention are de-coupled. That is, two separate lenses, lens 32 and lens 42, may be used. for these systems as opposed to the single lens 20 in the prior art shown in FIG. 3. The two systems thus do not share a common lens.

As a result, lens 32 and lens 42 may be separately optimized, avoiding the difficulties inherent in the prior art in attempting to use a single lens to focus laser beam 31 to the appropriate spot size 35, while simultaneously provide well-corrected, flat field imaging over the desired field-of-view for the camera. Lens 32 may be used to adjust the former, and lens 42 may be used to adjust the latter.

Figure 3:
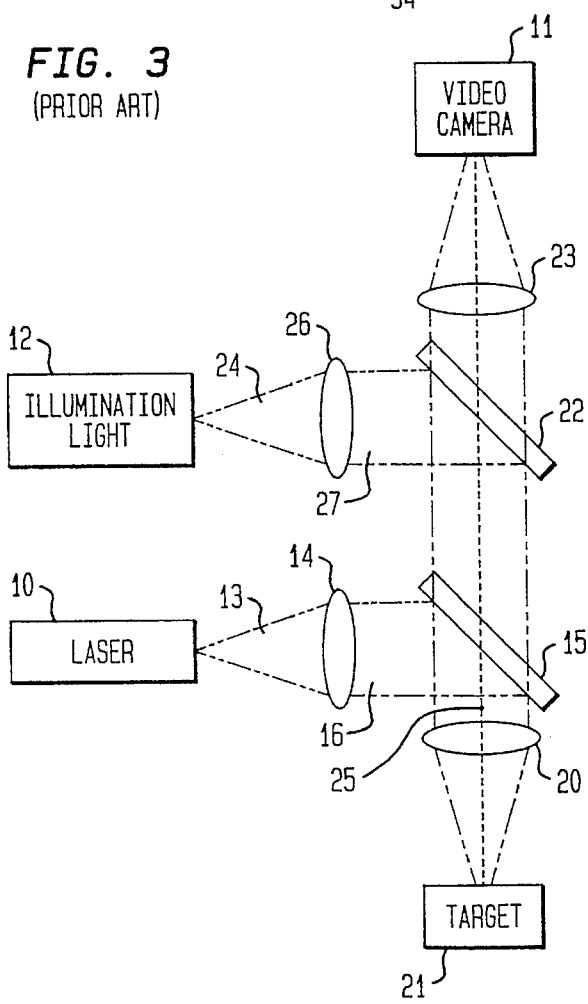
FIG. 3 is a schematic representation of a prior art laser material treatment apparatus.

Accordingly, using the present invention, the balance between laser spot size, working distance, and imaging performance may be achieved in a more economical and flexible manner than with the conventional layout shown in FIG. 3.

In addition, the present invention avoids the problems with back-reflected light that are inherent in the prior art apparatus because the illumination beams 51 impinge on target 34 at an angle. The light is thus not reflected back up the optical axis 40 to video camera 41, causing bright spots or stains on the image received by video camera 41. Accordingly, image quality may be improved.

Although dichroic mirror 36 and ring illuminator 50 are disposed between lens 32 and target 34, thus "consuming" working distance, this may be compensated for by using a larger diameter simple lens as lens 32. A larger diameter lens 32 may be used because lens 32 does not have to be flat-field corrected, as does lens 20 in the prior art apparatus of FIG. 3. This is an example of the flexibility achieved using the present invention.

While the present invention has been described in terms of an exemplary embodiment, it is contemplated that it may be practiced as outlined above with modifications that are within the spirit and scope of the appended claims. In particular, although the invention is disclosed in conjunction with an exemplary embodiment wherein a laser diode source is used, it is contemplated that the invention may be practiced with alternative laser sources, including conventional lasers, and still realize the economy and flexibility achieved with the invention.

What is claimed:

1. Apparatus for laser treatment of a material comprising:
   (a) means for generating a laser beam;
   (b) first focusing means for focusing said laser beam along an optical axis onto said material;
   (c) imaging means for monitoring treatment of said material, said imaging means having an optical path extending at least partially along said optical axis of said laser beam;
   (d) second focusing means separate from said first focusing means for focusing an image of said material onto said imaging means; and
   (e) illumination means disposed around said optical axis between said first focusing means and said material, for directly illuminating said material.

2. Apparatus for laser treatment of a material in accordance with claim 1 wherein said illumination means comprises an fiber optic bundle.

3. Apparatus for laser treatment of a material in accordance with claim 1 wherein said means for generating a laser beam is a laser diode.

4. Apparatus for laser treatnent of a material in accordance with claim 1 wherein said illumination means comprises a plurality of light emitting diodes.

5. In a material treatment apparatus having means for generating a laser beam, first focusing means for focusing the laser beam along an optical axis onto a material, imaging means for monitoring the material treatment, and second focusing means for focusing an image from said material onto said imaging means, the improvement comprising illumination means disposed around said optical axis between said first focusing means and said material, for directly illuminating said material.

6. Material treatment apparatus in accordance with claim 5 wherein said illumination means comprises a fiber optic bundle.

7. Material treatment apparatus in accordance with claim 5 wherein said illumination means comprises a plurality of light emitting diodes.

8. Apparatus for laser treatment of a material comprising:

(a) laser adapted to generate a laser beam;

(b) a first lens disposed in a path of said laser beam adapted to focus said laser beam into a focused beam having a predetermined cross-sectional diameter defining a spot;

(c) a dichroic mirror disposed in a path of said focused beam adapted to direct said focused beam along an optical axis such that said spot is produced on said material;

(d) a video camera having an optical path extending at least partially along said optical axis of said focused beam;

(e) a second lens disposed in a path of said video camera adapted to focus an image from said material onto said video camera; and (f) a ring illuminator disposed around said optical axis.

* * * * *